Figure 1:
Figure 2:

No. 673,955. Patented May 14, 1901.
J. E. H. HYDE.
WATERPROOFED LINE USED FOR FISHING.
(Application filed Dec. 6, 1900.)
(No Model.)

WITNESSES:
F. N. Roehrich.
James M. Stewart.

INVENTOR
J. Hindon Hyde

THE NORRIS PETERS CO., PHOTO-LITHO., WASHINGTON, D. C.

UNITED STATES PATENT OFFICE.

JOHN EDMUND HINDON HYDE, OF NEW YORK, N. Y.

WATERPROOFED LINE USED FOR FISHING.

SPECIFICATION forming part of Letters Patent No. 673,955, dated May 14, 1901.

Application filed December 6, 1900. Serial No. 38,864. (No model.)

*To all whom it may concern:*

Be it known that I, JOHN EDMUND HINDON HYDE, a citizen of the United States, residing in the city, county, and State of New York, (and whose post-office address is No. 120 Broadway, borough of Manhattan, city of New York,) have invented a new and useful Improvement in Waterproofed Lines Used for Fishing, of which the following is a specification.

My invention relates to the production of a new article of manufacture which consists of a flexible waterproofed line suitable for use either as a hand-line or coiled upon a reel or when used in the manufacture of fishing-nets.

It is known to those skilled in the art that a waterproofed fishing-line which can be used both in fresh water and in salt water without losing its waterproof property and in which either silk, flax, or cotton can be used as the fibrous portion of the line, as desired, without having such fibrous portion rotted by the coating, has long been sought but has never been obtained. Thus flexible waterproofed silk lines for fishing in fresh water have long been made and are useful when new; but the coating of such lines, as is well known, is apt to become sticky after a time, and the line also loses its original strength, while such lines are not efficient for use in salt water because the best waterproofing preparation used, the basis of which is linseed-oil, will not resist the chemical action of salt water. It is also well known to those skilled in the art that no waterproofed fishing-line suitable for use in salt water has been heretofore produced. Again, the linseed-oil preparations used for waterproofing fishing-lines used in fresh water cannot be used as a coating for fishing-lines made of flax or of cotton, even for use in fresh water, because they rot the flax and the cotton within a very short period. Practically, therefore, waterproofed fishing-lines heretofore made have consisted of silk coated with linseed-oil preparations, and while these are necessarily expensive they have a limited use, as above explained. Preparations of tar have been sometimes used to waterproof nets used in salt-water fishing, but such coating, besides impairing the strength of the fiber of the line, is not flexible enough under ordinary conditions of temperature, and it becomes sticky in warm weather and brittle in cold weather and is totally unsuitable for waterproofing fishing-lines used as such.

The object of my invention has been to produce a waterproofed fishing-line in which the fibrous portion may consist of silk, flax, or cotton, as desired, coated with a flexible covering which is sufficiently hard, is elastic, is smooth, does not impair the strength of the fiber used, resists disintegration by the air, salt water, and fresh water, clings tenaciously to the line, and preserves all of these qualities both in hot and cold weather. I have discovered that a waterproofed line having all these characteristics may be made by coating the fibrous portion with a thin solution of pyroxylin, which upon evaporation of the volatile solvents leaves as a residue a composition of matter consisting of dissolved pyroxylin, a non-drying non-volatile oil which is soluble in alcohol but not in water, and an anti-acid substance which neutralizes acids and which is practically insoluble in water.

In the accompanying drawing, A represents the fibrous portion of the line, and B represents the coating, both of which are magnified in the drawing, although for some purposes the fibrous portion may be of the size represented in the drawing. A suitable solution for this coating, for instance, is pyroxylin, one hundred parts, by weight; castor-oil, two hundred and fifty parts, by weight; amyl acetate, four hundred parts, by weight; magnesium carbonate, two parts, by weight; and wood-spirit, six hundred parts, by weight. The amount of wood-spirit can be increased or decreased, according to the consistency wished in the coating solution, although I recommend that a thin solution be used and the thickness of the coating increased as desired by repeated applications of the solution. The function of these constituents is as follows: The dissolved pyroxylin gives consistency to the coating. The castor-oil gives the requisite flexibility and also toughens the vegetable fibers which may be used in the line. The wood-spirit and amyl acetate act as solvents, the amyl acetate causing a sufficiently-slow evaporation of the solvents to produce a practically nonporous homogeneous residuum. The magnesium carbonate, while practically insoluble in water, neutralizes any nitrous acid derived from the pyroxylin, which would otherwise tend to cause decomposition of the pyroxylin and impair the strength of the fibrous portion of the line and also would tend to change the glyceride of ricinoleic acid contained in the castor-oil into the solid modification ricinelaidic acid, and thus impair the flexibility of the line. I do not, however, confine myself to the use of a coating solution which contains these specific solvents and neutralizing agent, nor to the specific proportions mentioned, because any equivalent substances may be used with the dissolved pyroxylin which have the same properties and functions, and the proportions may be varied without departing from my invention. Thus there are certain waxy substances and there are oils, such as fish-oils and cotton-seed oil, which are just on the border-land between drying and non-drying, in that while they never harden by oxidization, so as to prevent flexibility, they do become thicker in consistency after exposure to the air. Such substances as they, which are really non-drying and have the functions stated as requisite, are equivalents in my invention for the castor-oil and are included under the term "non-drying oil." Linseed-oil is a type of drying-oil which is not suitable for my invention, and castor-oil is a type of oil which is suitable for my invention. So, also, there are other anti-acid substances which are practically insoluble in water, such as calcium carbonate and calcium lactate, which may be used as equivalents for the magnesium carbonate; but while I prefer the use of anti-acid substances, which are practically insoluble in water, I do not limit myself to the use of insoluble anti-acids, since an inferior result may be achieved by the use of soluble anti-acids, because even if soluble in water they are largely prevented from coming into contact with the water by the other ingredients present in the compound.

The coating solution may be applied to the fibrous portion of the line in any suitable manner; but I have found that an efficient method is to pass the twisted or braided fiber through the solution at ordinary temperatures and scrape off the excess solution, and that the line so coated should be drawn some distance through the air in a perpendicular direction to permit the volatile solvents to escape. In the case of nets the line may be first coated with the waterproofing solution and subsequently manufactured into the net, or the unwaterproofed net may be dipped into the waterproofing solution and subsequently exposed to the air.

I do not claim as my invention the pyroxylin compound above described, nor do I claim, broadly, a waterproofed fishing-line; but, Having described my invention, what I claim is—

1. A fishing-line either for use as a line or for use in the form of nets, waterproofed by a composition of matter consisting of dissolved pyroxylin, a non-drying fatty substance soluble in a solvent of pyroxylin but not in water, and an anti-acid substance, substantially as described.

2. A fishing-line, either for use as a line or for use in the form of nets, waterproofed by a composition of matter consisting of dissolved pyroxylin, a non-drying, non-volatile oil soluble in alcohol but not in water, and an anti-acid substance which neutralizes acids and which is practically insoluble in water, substantially as described.

3. A fishing-line, either for use as a line or for use in the form of nets, waterproofed by a composition of matter consisting of dissolved pyroxylin, a solvent of pyroxylin, a non-drying, non-volatile oil soluble in alcohol but not in water, and an anti-acid substance which neutralizes acids and which is practically insoluble in water, substantially as described.

4. A fishing-line, either for use as a line or for use in the form of nets, waterproofed by a composition of matter consisting of dissolved pyroxylin, castor-oil, and magnesium carbonate, substantially as described.

5. A fishing-line, either for use as a line or for use in the form of nets, waterproofed by a composition of matter consisting of dissolved pyroxylin, castor-oil, amyl acetate, magnesium carbonate, and wood-spirit, substantially as described.

JOHN EDMUND HINDON HYDE.

Witnesses:
JAMES M. STEWART,
JOHN E. JUDGE.